(12) United States Patent
Ye

(10) Patent No.: US 9,946,623 B2
(45) Date of Patent: Apr. 17, 2018

(54) BENCHMARK UPDATING METHOD AND SYSTEM FOR TOUCH DETECTION TERMINAL CAPABLE OF ELIMINATING LARGE-AREA INTERFERENCE

(71) Applicant: SHENZHEN GOODIX TECHNOLOGY CO., LTD., Shenzhen, Guangdong (CN)

(72) Inventor: Jinchun Ye, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 745 days.

(21) Appl. No.: 14/548,881

(22) Filed: Nov. 20, 2014

(65) Prior Publication Data
US 2015/0081249 A1 Mar. 19, 2015

Related U.S. Application Data

(63) Continuation of application No. PCT/CN2013/074978, filed on Apr. 28, 2013.

(30) Foreign Application Priority Data

Jun. 8, 2012 (CN) .......................... 2012 1 0201178

(51) Int. Cl.
G06F 3/041 (2006.01)
G06F 11/34 (2006.01)
G06F 3/044 (2006.01)

(52) U.S. Cl.
CPC .......... *G06F 11/3428* (2013.01); *G06F 3/044* (2013.01); *G06F 3/0418* (2013.01)

(58) Field of Classification Search
None
See application file for complete search history.

(56) References Cited

U.S. PATENT DOCUMENTS

2007/0242053 A1  10/2007  Muranaka
2011/0241907 A1* 10/2011  Cordeiro ............... G06F 3/0418
                                                                    341/20

FOREIGN PATENT DOCUMENTS

| CN | 101055507 | 10/2007 |
| CN | 202177880 | 3/2012 |
| CN | 102479009 | 5/2012 |
| CN | 102722286 | 10/2012 |

OTHER PUBLICATIONS

International Search Report filed in PCT/CN2013/074978 dated Jul. 11, 2013.

* cited by examiner

*Primary Examiner* — Joseph Haley

(57) ABSTRACT

The present invention is applicable to the technical field of touch control, and provides a benchmark updating method for a touch detection terminal under large-area interference. The present invention can reduce the phenomenon of misdetection by performing consistency analysis on an original sampled value.

5 Claims, 4 Drawing Sheets

| Dn | S0 | S1 | S2 | S3 | S4 | S5 | S6 | S7 | S8 | S9 |
|----|----|----|----|----|----|----|----|----|----|----|
|    |    |    |    |    |    |    |    |    |    |    |

FIG. 1

| D1  | S1-S0 | S2-S1 | .. . | S8-S7 | S9-S8 |
|-----|-------|-------|------|-------|-------|
| D2  | S1-S0 | S2-S1 | .. . | S8-S7 | S9-S8 |
| D3  | S1-S0 | S2-S1 | .. . | S8-S7 | S9-S8 |
| ... | ...   |       |      |       |       |
| D14 | S1-S0 | S2-S1 | .. . | S8-S7 | S9-S8 |
| D15 | S1-S0 | S2-S1 | .. . | S8-S7 | S9-S8 |
| D16 | S1-S0 | S2-S1 | .. . | S8-S7 | S9-S8 |

FIG. 2

| D2—D1   | D2[S1-S0]-D1[S1-S0]   | ... | D2[S9-S8]-D1[S9-S8]   |
|---------|------------------------|-----|------------------------|
| D3—D2   | D3[S1-S0]-D2[S1-S0]   | ... | D3[S9-S8]-D2[S9-S8]   |
| D4—D3   | D4[S1-S0]-D3[S1-S0]   | ... | D4[S9-S8]-D3[S9-S8]   |
| ...     | ...                    |     |                        |
| D14—D13 | D14[S1-S0]-D13[S1-S0] | ... | D14[S9-S8]-D13[S9-S8] |
| D15—D14 | D15[S1-S0]-D14[S1-S0] | ... | D15[S9-S8]-D14[S9-S8] |
| D16—D15 | D16[S1-S0]-D15[S1-S0] | ... | D16[S9-S8]-D15[S9-S8] |

FIG. 3

BENCHMARK UPDATING METHOD AND SYSTEM FOR TOUCH DETECTION TERMINAL CAPABLE OF ELIMINATING LARGE-AREA INTERFERENCE

FIELD OF THE INVENTION

The present invention relates to the technical field of touch control, and more particularly to a benchmark updating method and system for a touch detection terminal under large-area interference.

BACKGROUND OF THE INVENTION

When a mutual capacitance touch detection scheme is applied to a handheld terminal device, particularly to a mobile phone product, errors of initialization establishment benchmarks may often be caused because a palm presses a large area of a touch screen or another object contacts a large area of a touch screen during initialization. Even if the palm or object is removed, a persistent key-pressing operation may be wrongly detected, which may cause that normal user operations are unable to be responded. A typical problematic scene is that: a mobile phone, with the LCD thereof being in a non-display situation, is grasped by a hand of a user or put in a pocket of the user; when a call suddenly comes in, the LCD is lighted up, but the user finds that the mobile phone cannot be unlocked and the call cannot be answered. At present, all mutual capacitance schemes, including iphone, have this problem. Another situation is that: on the premise of a normal initialization benchmark, a large palm presses a normally working touch screen, and a persistent key-pressing operation may be wrongly detected after the palm is removed, which may cause that user operations are unable to be responded.

The above-mentioned misdetection phenomenon is mainly caused by the reason that the difference data characteristics detected by multiple fingers, even by a single finger, in normal situations is very similar to the difference characteristics detected when the benchmark has been updated under the condition of pressing a large area and the pressure is removed. Therefore, it is unable to distinguish between normal multiple finger touches and "misoperation points" formed after pressing a large area.

SUMMARY OF THE INVENTION

The technical problem to be solved by the present invention is to provide a benchmark updating method and system for a touch detection terminal under large-area interference, which is configured to reduce the phenomenon of misdetection and ensure that normal user operations can be responded.

The present invention is realized by the following technical solution: a benchmark updating method for a touch detection terminal capable of eliminating large-area interference, comprising the following steps:

step A: powering up a touch detection terminal, establishing a benchmark value in one-to-one correspondence with each touch detection node, and calculating a reference consistency value of the touch screen benchmark according to the established benchmark value, wherein the reference consistency value of the touch screen benchmark is a reference value used to represent closeness among the benchmark values of the touch detection nodes;

step B: sampling the touch detection nodes to obtain sampling data of the touch detection nodes, calculating a current consistency value of the touch screen according to the sampling data, and recording a historical minimum value of the current consistency value, wherein the current consistency value of the touch screen is used to represent closeness among the current sampling data of the touch detection nodes; and step C: if the current consistency in the step B is less than the reference consistency value in the step A by a constant value, determining that a currently detected touch operation is a misoperation point after a large-area interference is removed and updating the benchmark and the reference consistency; judging whether the closeness of the current consistency value in the step B to the historical minimum value of the current consistency in the step B is within an allowable range, and if yes, determining that the currently detected touch operation is caused by a large-area interference and updating the benchmark and the reference consistency.

The present invention further provides a benchmark updating system for a touch detection terminal capable of eliminating large-area interference, which comprises:

a benchmark value establishing unit configured to establish a benchmark value in one-to-one correspondence with each touch detection node when the touch detection terminal is powered up;

a reference consistency calculating unit configured to calculate a reference consistency value of the touch screen benchmark according to the benchmark value established by the benchmark value establishing unit, wherein the reference consistency value of the touch screen benchmark is a reference value used to represent closeness among the benchmark values;

a sampling unit configured to sample the touch detection nodes and thereby obtain sampling data of the touch detection nodes;

a current consistency calculating unit configured to calculate the current consistency value of the touch screen benchmark according to the sampling data of the sampling unit, wherein the current consistency value of the touch screen benchmark is used to represent closeness among the current benchmark values; and a benchmark value updating unit configured to: judge whether the closeness of the current consistency value obtained from calculation of the current consistency calculating unit to the reference consistency value obtained from calculation of the reference consistency calculating unit is within an allowable range, and if yes, determine that the currently detected touch operation is caused by large-area interference and update the benchmark value.

The present invention further provides a touch control terminal, which comprises the above-mentioned benchmark updating system for a touch detection terminal capable of eliminating large-area interference.

In the present invention, the consistency of the original sampling values is analyzed to determine whether a currently detected touch operation is caused by an error of the benchmark value itself due to large-area interference or is caused by a real user operation. When detecting that the touch operation is caused by large-area interference, the benchmark is updated, so that the phenomenon of misdetection can be reduced, and it is ensured that normal user operations can be responded.

BRIEF DESCRIPTION OF THE DRAWINGS

FIG. 1 is a diagram of original values of data corresponding to one drive of a 16×10 capacitive touch screen according to one embodiment of the present invention.

FIG. 2 is a diagram obtained by differentiating the drive data in the diagram shown in FIG. 1 along a column direction.

FIG. 3 is a diagram obtained by differentiating the difference values in the diagram shown in FIG. 2 along a sensing direction.

DETAILED DESCRIPTION OF THE PREFERRED EMBODIMENT

Figure 4:
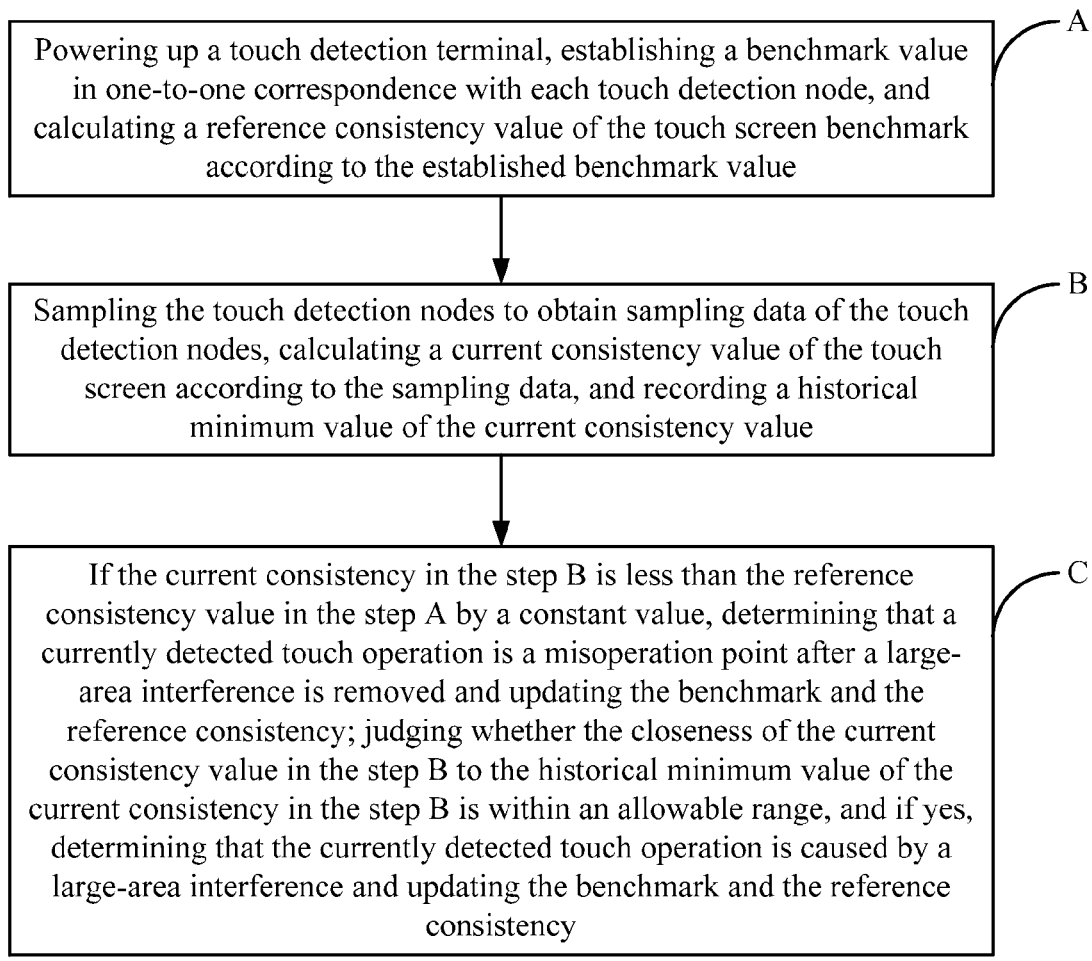
FIG. 4 is a flow chart for realizing a benchmark updating method for a touch detection terminal capable of eliminating large-area interference, according to an embodiment of the present invention.

In order to make the objectives, technical solutions, and advantages of the present invention be clearer, the present invention will be further described hereafter with reference to the accompany drawings and embodiments. It should be understood that the embodiments described herein are only intended to illustrate but not to limit the present invention.

In the present invention, the consistency of the original sampling values is analyzed to determine whether a currently detected touch operation is caused by an error of the benchmark value itself due to large-area interference or is caused by a real user operation. When detecting that the touch operation is caused by large-area interference, the benchmark value is updated.

At first, a concept of "touch screen benchmark consistency" is introduced. Each mutual capacitance node can obtain original data reflecting the node capacitance by sampling, the original data of all nodes of a screen constitutes a matrix, the matrix is differentiated along a row direction to generate a difference value matrix, the difference value matrix is differentiated in a second order along a column direction, and the sum of absolute values of the second order difference values is regarded as the current consistency of the touch screen. It can be known from above definition and mathematical argumentation that, if the original value matrix is first differentiated along the column direction, and is then differentiated in a second order along the row direction, the same sum of the absolute values of the second order difference values can still be obtained.

As an example, in a 16×10 capacitive touch screen, original values of data corresponding to one drive thereof is shown in the diagram of FIG. 1. The drive data is then differentiated (differentiating the matrix along a column direction), and values in the diagram of FIG. 2 are obtained. The values of FIG. 2 are differentiated again, that is, differentiated along a sensing direction (along a row direction), and values in the diagram of FIG. 3 are obtained. Absolute values of the 15×9 data shown in FIG. 3 are calculated and added together, and thus the consistency of the touch screen is obtained.

Assuming that materials and processes of the same sensor (sensing electrode) are consistent, and capacitances and resistances at all nodes are identical, the theoretical values of the second order difference are zero. In fact, the line impedances of the sensor have deviations, and the impedance of the ITO has deviation too. However, data characteristics corresponding to the drives or the sensing passages have self similarity, for example, the data corresponding to each of the sensing passages uniformly decreases from left to right, though there may be differences between data ranges corresponding to different sensing passages; and data corresponding to the same drive is more consistent, though there are differences between data ranges corresponding to different drives.

As can be seen from above definition, if a direct current (DC) component is added to one of the drives or one of the senses, the current consistency of the screen will not be affected.

If the above-mentioned operations are applied to the benchmark value, we can obtain consistency of the benchmark value, and we call the consistency of the benchmark value as reference consistency. In normal situations, when a finger touches the screen, the current consistency becomes worse than the consistency of the benchmark value, because the touch variation is equal to adding a convex closure and a concave closure. When the benchmark is wrong and misoperation points are generated, the current consistency of the screen will be similar to the consistency under the condition that there is no real touch event, and will certainly become better than the consistency of the benchmark value (the reference consistency), that is, the current consistency is more close to zero. In the present invention, through this basic idea, real user operations can be distinguished from misoperation points.

FIG. 4 shows a flow chart for realizing a benchmark updating method for a touch detection terminal capable of eliminating large-area interference, according to an embodiment of the present invention. The method is detailed as follows.

In a step A, the touch detection terminal is powered up, a benchmark value in one-to-one correspondence with each touch detection node is established, and a reference consistency value of the touch screen benchmark is calculated according to the established benchmark value.

In this embodiment of the present invention, the reference consistency value of the touch screen benchmark is a reference value used to represent closeness among the benchmark values of the touch detection nodes. After the touch detection terminal is powered up, by the above-mentioned method, a reference consistency value of an original touch screen benchmark is calculated according to the originally established benchmark value. In the subsequent working process of the touch detection terminal, it is possible to update the reference consistency value of the touch screen benchmark according to particular sampling data.

In a step B, the touch detection nodes are sampled, and sampling data of the touch detection nodes is obtained; the current consistency of the touch screen is calculated according to the sampling data, and the historical minimum value of the current consistency is recorded; the current consistency value of the touch screen is used to represent closeness among the current sampling data of the touch detection nodes.

For reducing fluctuation of the current consistency and improving the judging accuracy, in the present invention, the consistency is obtained by sampling at certain time intervals, for example, a time interval can be 160 ms, the consistency is substantially detected 16 times in the 160 ms, sampling is performed every 10 ms, and finally the sampling values obtained from the 16 times of sampling are averaged. When the 16 values are averaged, each sampling value needs to fluctuate in a range being less than 200 relative to the first value obtained in the present window (in order to prevent one averaging calculation from including both values obtained before and after a finger operation). In particular, the step B specifically includes the following steps:

Step B1: every time after a predetermined time interval, sampling the touch detection nodes, and calculating the current consistency value of the touch screen benchmark according to the sampling data.

Step B2: when the number of times for calculating the current consistency value in the step B1 reaches a predetermined number threshold value, calculating the average value of the current consistency values.

In particular, the step B1 comprises:

Step B11: sampling the touch detection nodes, and calculating the current consistency value of the touch screen benchmark according to the sampling data;

Step B12: at each subsequent sampling, judging whether the closeness of the current sampling data to the first sampling data is within a predetermined second range threshold value; if yes, recording the sampling data, and executing the step B2 when the number of times for recoding the sampling data reaches a predetermined number threshold value; if no, executing the step B11 again.

In a step C, if the current consistency in the step B is less than the reference consistency value in the step A by a constant value, determining that a currently detected touch operation is a misoperation point after a large-area interference is removed, and updating the benchmark and the reference consistency; judging whether the closeness of the current consistency value in the step B to the historical minimum value of the current consistency in the step B is within an allowable range, if yes, determining that the currently detected touch operation is caused by a large-area interference, and updating the benchmark and reference consistency.

In the present invention, the large-area inference includes palm pressing, large-area water immersion, etc. In the general situations, the misoperation points are misoperation points generated after a large-area interference is removed. Under the circumstance of no interference and no touch, a fluctuation range of the current consistency of the touch screen is impossible to reach 500 so much. When the current consistency is 500 more than the reference consistency, it can be considered that the current benchmark has obvious problems, and therefore an action for forcibly updating the benchmark must be performed. If there is a large-area touch or a multi-touch, the current consistency deteriorates quickly relative to the normal reference consistency. If the current consistency is close to the historical minimum consistency from the initialization (plus or minus not more than 200), this abnormal phenomenon is that a touch action is mistakenly detected due to benchmark errors. Therefore, in this situation, updating the benchmark in time can recover from this wrong status and prevent the input device from crashing.

Obviously, the aforementioned method is only adapted to suspected multi-touch operations. If only a single point is mistakenly triggered at present, the above-mentioned updating method cannot update the benchmark in time. Aiming at the situation of a single misoperation point, a comparison updating method based on backup of the benchmark and back up the current consistency is added to this embodiment:

First, based on backup of the current consistency. When a single point occurs in an abnormal situation, if the current consistency becomes better relative to the reference consistency, and the position of the single point is close to the largest negative difference value, that is, a negative value having the largest absolute value, of a drive to which it belongs, the point is considered as a misoperation point caused by a benchmark error due to an abnormal update, and thus the benchmark is updated. Therefore, the step C specifically comprises:

Step C21: judging whether the current status is abnormal according to the sampling data of the step B, if yes, further judging whether there is a suspected single-touch operation;

Step C22: if the step C21 judges that there is a suspected single-touch operation, further judging whether the current consistency value is closer to zero relative to the reference consistency value, and whether the position of the suspected single-touch operation is close enough to the position of a negative value having the largest absolute value in the sampling data of the step B; if yes, updating the benchmark value.

Second, based on backup of the current benchmark. When an abnormal update occurs (may be caused by large-area interferences or water interferences), it represents that the whole screen has only large negative values or large positive values do not meet physical relevance, and thus the abnormal update occurs. Before the abnormal update occurs, only normal updates (updates caused by slow environmental changes) may occur. Therefore, when an abnormal update occurs, the former benchmark is backed up, and is marked with an abnormal status label. In the abnormal status, if there is a single point, a comparison process is started: subtracting a current difference value from the backup benchmark, and making a judgment to the difference to detect whether there is a convex closure on a drive; if yes, regarding the single point as a real user touch; if no, regarding the single point as a misoperation point, and forcibly executing a benchmark update. In particular, after the step C, the method further comprises the following steps:

Step F: if the touch screen is in an abnormal status at present, backing up the benchmark value before updating, marking the backup with an abnormal status label, and then updating the benchmark value.

Step G: when the touch screen is in the abnormal status marked in the step F, if there is a suspected single-touch operation at present, subtracting the current sampling data from the benchmark value backed up in the step F to obtain a group of difference values, and judging whether the suspected single-touch operation is a real user operation according to the largest difference value and the least difference value in the difference values; if no, updating the benchmark value.

One of ordinary skill in the art can understand that realization of all or some steps of the methods provided by the above-mentioned embodiments can be achieved by program instructing relevant hardware, the program can be stored in computer-readable storage medium, and the storage medium can be a ROM/RAM, a disk, a CD-ROM, etc.

Figure 5:
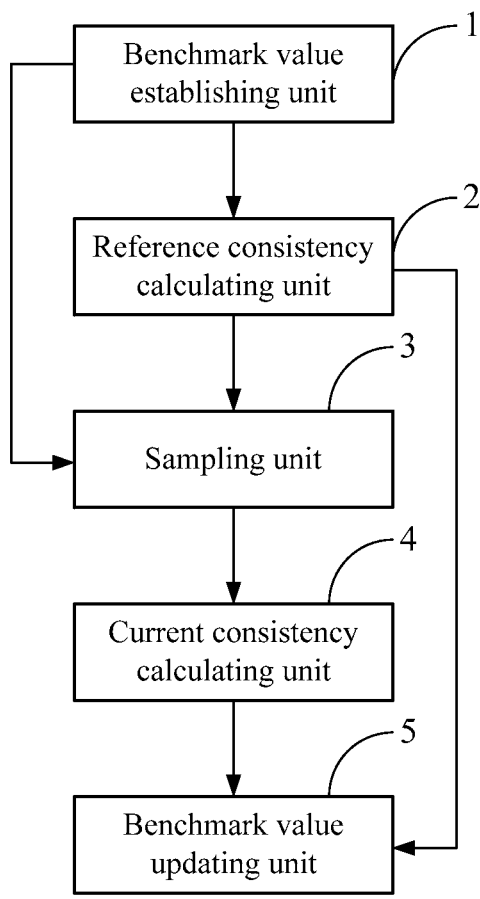
FIG. 5 is a structural schematic diagram of a benchmark updating system for a touch detection terminal capable of eliminating large-area interference, according to an embodiment of the present invention.

FIG. 5 shows a structural schematic diagram of a benchmark updating system for a touch detection terminal capable of eliminating large-area interference, according to an embodiment of the present invention. The benchmark updating system can be a software unit, a hardware unit, or a combination unit of software and hardware built in a touch control terminal. In order to facilitate the description, only the relevant parts of this embodiment are shown.

Referring to FIG. 5, the benchmark updating system at least includes a benchmark value establishing unit 1, a reference consistency calculating unit 2, a sampling unit 3, a current consistency calculating unit 4, and a benchmark value updating unit 5. When the touch detection terminal is powered up, the benchmark value establishing unit 1 establishes a benchmark value in one-to-one correspondence with each touch detection node. The reference consistency calculating unit 2 calculates a reference consistency value of the touch screen benchmark according to the benchmark value established by the benchmark value establishing unit 1, wherein, the reference consistency value of the touch screen benchmark is a reference value used to represent closeness among the benchmark values. The sampling unit 3 samples the touch detection nodes, and thereby obtains sampling data of the touch detection nodes. The current consistency calculating unit 4 calculates the current consistency value of the touch screen benchmark according to the sampling data of the sampling unit 3, and the current consistency value of the touch screen benchmark is used to represent closeness among the current benchmark values. Finally, the benchmark value updating unit 5 judges whether the closeness of the current consistency value obtained from calculation of the current consistency calculating unit 4 to the reference consistency value obtained from calculation of the reference consistency calculating unit 2 is within an allowable range, and if yes, determines that the currently detected touch operation is caused by large-area interference, and updates the benchmark value.

Furthermore, the above-mentioned benchmark updating system further includes a first judging unit configured to judge whether the current consistency value obtained from calculation of the current consistency calculating unit 4 is less than the reference consistency value obtained from calculation of the reference consistency calculating unit 2, and the difference between the two values is greater than a first difference threshold value; and if yes, trigger the benchmark value updating unit 5 to update the benchmark value, and trigger the reference consistency calculating unit 2 to calculate a new reference consistency value according to the updated benchmark value.

Furthermore, the above-mentioned benchmark updating system further includes a minimum consistency value calculating unit configured to initialize the minimum consistency value of the touch screen benchmark into the reference consistency value, and when the current consistency value obtained from calculation of the current consistency calculating unit 4 is less than the minimum consistency value, update the minimum consistency value into the current consistency value, wherein the minimum consistency value of the touch screen benchmark is used to represent the historical minimum value of the closeness of the benchmark values.

When a suspected multi-touch operation occurs at present, and the closeness of the current consistency value obtained from calculation of the current consistency calculating unit 4 to the minimum consistency value is within a predetermined first range threshold value, the minimum consistency value calculating unit updates the minimum consistency value into the current consistency value, obtains the reference consistency value again, and thus triggers the sampling unit 3 to sample again and triggers the current consistency calculating unit 4 to calculate the current consistency value of the touch screen benchmark again.

Figure 6:
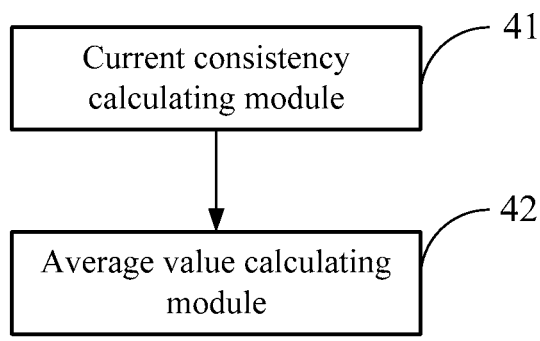
FIG. 6 is a structural schematic diagram of the current consistency calculation unit shown in FIG. 5.

Furthermore, for reducing fluctuation of the current consistency and improving the judging accuracy, as shown in FIG. 6, the current consistency calculating unit 4 includes: a current consistency calculating module 41 and an average value calculating module 42; the current consistency calculating module 41 is configured to calculate the current consistency value of the touch screen benchmark according to the sampling data collected by the sampling unit 3 every time after a predetermined time interval, and the average value calculating module 42 is configured to calculate the average value of the current consistency values when the number of times for obtaining the current consistency values by the current consistency calculating module 41 reaches a predetermined number threshold value.

Figure 7:
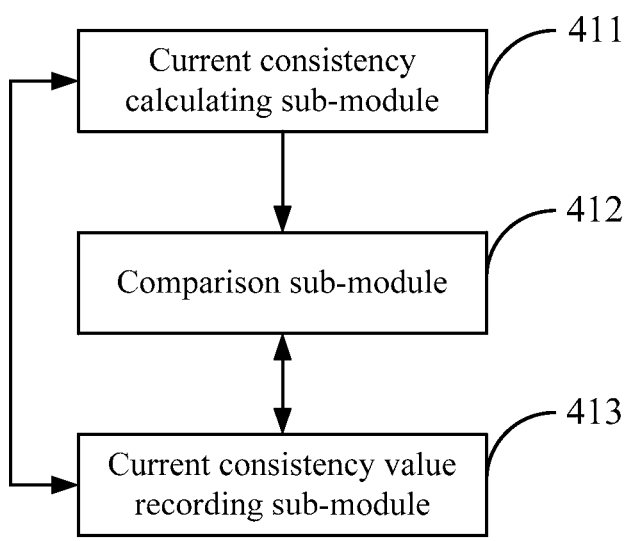
FIG. 7 is a structural schematic diagram of the current consistency calculation module shown in FIG. 6.

Furthermore, in order to prevent one averaging calculation from including both values obtained before and after a finger operation, as shown in FIG. 7, the above-mentioned current consistency calculating module 41 further includes a current consistency calculating sub-module 411, a comparison sub-module 412, and a current consistency value recording sub-module 413. The current consistency calculating sub-module 411 is configured to calculate the current consistency value of the touch screen benchmark according to the sampling data collected by the sampling unit 3 every time after a predetermined time interval. The comparison sub-module 412 compares the current consistency values obtained from the second and subsequent calculations of the current consistency calculating sub-module 411 with the current consistency value obtained from the first calculation, and judges whether the closeness is within a predetermined second range threshold value. The current consistency value recording sub-module 413 is configured to: first record the current consistency value obtained from the first calculation, then record the current consistency values obtained from calculations when the result of comparing the current consistency values obtained from the second and subsequent calculations with the current consistency value obtained from the first calculation by the comparison sub-module 412 every time is that the closeness is within the predetermined second range threshold value, trigger the average value calculating module 42 to calculate the average value of the current consistency values when the number of times for recording the current consistency values reaches a predetermined number threshold value, and trigger the current consistency calculating sub-module 411 to calculate again and trigger the comparison sub-module 412 to compare again when the comparison result is that the closeness is not within the predetermined second range threshold value.

Furthermore, the above-mentioned benchmark updating system further includes a second judging unit configured to: judge whether the touch screen is in an abnormal status at present according to the sampling data of the sampling unit 3, if yes, further judge whether there is a suspected single-touch operation; if judging that there is a suspected single-touch operation, further judge whether the current consistency value is closer to zero relative to the reference consistency value, and whether the position of the suspected single-touch operation is close enough to the position of a negative value having the largest absolute value in the sampling data of the sampling unit 3; if yes, update the benchmark value using the benchmark value updating unit 5.

Furthermore, the above-mentioned benchmark updating system further includes a third judging unit and a fourth judging unit; the third judging unit is configured to: judge whether the touch screen is in an abnormal status at present according to the sampling data of the sampling unit 3, if the judging result is that the touch screen is in an abnormal status at present, back up the benchmark value before updating, set an abnormal status label, and trigger the benchmark value updating unit 5 to update the benchmark value; and the fourth judging unit is configured to: when the touch screen is in the abnormal status labeled by the third judging unit, if there is a suspected single-touch operation, subtract the current sampling data from the benchmark value backed up by the third judging unit to obtain a group of difference values, and judge whether the suspected single-touch operation is a real user operation according to the largest difference value and the least difference value in the difference values; and if no, trigger the benchmark value updating unit 5 to update the benchmark value.

In the present invention, the consistency of the original sampling values is analyzed to determine whether a currently detected touch operation is caused by an error of the benchmark value itself due to large-area interference or is caused by a real user operation. When detecting that the touch operation is caused by large-area interference, the benchmark is updated, so that the phenomenon of misdetection can be reduced, and it is ensured that normal user operations can be responded. The present invention is accurate and reliable, does not rely on the consistency among a batch of touch screen individuals, and only relies on the internal data of each touch screen individual. Even if the data of one individual differs significantly from the data of another individual, this method is still applicable, and therefore the method has good versatility and adaptability. The present invention can effectively eliminate large-area pressing misoperation points under a variety of conditions, and can also effectively eliminate the phenomenon of misoperation point under the circumstance of powering up with water or powering up by pressing.

What described above are only preferred embodiments of the present invention, and are not intended to limit the scope of the present invention; and any modifications, equivalent replacements, and improvements made within the spirit and principle of the present invention should be included in the protection scope of the present invention.

What is claimed is:

1. A benchmark updating method for a touch detection terminal capable of eliminating large-area interference, comprising the following steps:
    step A: powering up a touch detection terminal, establishing a benchmark value in one-to-one correspondence with each touch detection node, and calculating a reference consistency value of the touch screen benchmark according to the established benchmark value, wherein the reference consistency value of the touch screen benchmark is a reference value used to represent closeness among the benchmark values of the touch detection nodes;
    step B: sampling the touch detection nodes to obtain sampling data of the touch detection nodes, calculating a current consistency value of the touch screen according to the sampling data, and recording a historical minimum value of the current consistency value, wherein the current consistency value of the touch screen is used to represent closeness among the current sampling data of the touch detection nodes; and
    step C: if the current consistency in the step B is less than the reference consistency value in the step A by a constant value, determining that a currently detected touch operation is a misoperation point after a large-area interference is removed and updating the benchmark and the reference consistency; judging whether the closeness of the current consistency value in the step B to the historical minimum value of the current consistency in the step B is within an allowable range, and if yes, determining that the currently detected touch operation is caused by a large-area interference and updating the benchmark and the reference consistency.

2. The benchmark updating method for a touch detection terminal according to claim 1, wherein, the step B further comprises the following steps:
    step B1: every time after a predetermined time interval, sampling the touch detection nodes, and calculating the current consistency value of the touch screen benchmark according to the sampling data; and
    step B2: when the number of times for calculating the current consistency value in the step B1 reaches a predetermined number threshold value, calculating the average value of the current consistency values.

3. The benchmark updating method for a touch detection terminal according to claim 2, wherein, the step B1 further comprises the following steps:
    step B11: every time after a predetermined time interval, sampling the touch detection nodes, and calculating the current consistency value of the touch screen benchmark according to the sampling data; and
    step B12: recording the current consistency value obtained from the first calculation, in each subsequent sampling, judging whether the closeness of the sampling data to the first sampling data is within a predetermined second range threshold value; if yes, recording the sampling data, and executing the step B2 when the number of times for recoding the sampling data reaches a predetermined number threshold value; if no, executing the step B11 again.

4. The benchmark updating method for a touch detection terminal according to claim 1, wherein, the step C further comprises the following steps:
    step C21: judging whether the current status is abnormal according to the sampling data of the step B, if yes, further judging whether there is a suspected single-touch operation; and
    step C22: if the step C21 judges that there is a suspected single-touch operation, further judging whether the current consistency value is closer to zero relative to the reference consistency value, and whether the position of the suspected single-touch operation is close enough to the position of a negative value having the largest absolute value in the sampling data of the step B; if yes, updating the benchmark value.

5. The benchmark updating method for a touch detection terminal according to claim 1, wherein, after the step C, the method further comprises the following steps:
    step F: if the touch screen is in an abnormal status at present, backing up the benchmark value before updating, marking the backup with an abnormal status label, and then updating the benchmark value; and
    step G: when the touch screen is in the abnormal status marked in the step F, if there is a suspected single-touch operation at present, subtracting the current sampling data from the benchmark value backed up in the step F to obtain a group of difference values, and judging whether the suspected single-touch operation is a real user operation according to the largest difference value and the least difference value in the difference values; if no, updating the benchmark value.

* * * * *